US 9,781,569 B2

(12) United States Patent
Zeng et al.

(10) Patent No.: US 9,781,569 B2
(45) Date of Patent: Oct. 3, 2017

(54) SYSTEMS AND METHODS FOR RESOLVING POSITIONAL AMBIGUITIES USING ACCESS POINT INFORMATION

(71) Applicant: GM GLOBAL TECHNOLOGY OPERATIONS LLC, Detroit, MI (US)

(72) Inventors: Shuqing Zeng, Sterling Heights, MI (US); Fan Bai, Ann Arbor, MI (US); Priyantha Upali Mudalige, Oakland Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/656,305

(22) Filed: Mar. 12, 2015

(65) Prior Publication Data
US 2016/0269867 A1 Sep. 15, 2016

(51) Int. Cl.
*H04W 4/02* (2009.01)
(52) U.S. Cl.
CPC ........... *H04W 4/027* (2013.01); *H04W 4/023* (2013.01)
(58) Field of Classification Search
None
See application file for complete search history.

(56) References Cited

U.S. PATENT DOCUMENTS

| 9,220,081 | B2 | 12/2015 | Prechner et al. |
| 2005/0037775 | A1 | 2/2005 | Moeglein et al. |
| 2011/0059752 | A1 | 3/2011 | Garin et al. |
| 2014/0269441 | A1* | 9/2014 | Hyde ............ H04W 4/24 370/259 |
| 2014/0273924 | A1* | 9/2014 | Hyde ............ H04W 4/02 455/405 |
| 2014/0274056 | A1* | 9/2014 | Hyde ............ H04W 48/18 455/436 |
| 2014/0274078 | A1* | 9/2014 | Hyde ............ H04W 16/18 455/446 |
| 2015/0057018 | A1 | 2/2015 | Moeglein et al. |
| 2016/0353242 | A1* | 12/2016 | Zeng ............ H04W 4/046 |

OTHER PUBLICATIONS

Zeng, S., U.S. Appl. No. 14/722,566 entitled "Systems and Methods for Determining Network Access Point Locations," filed May 27, 2015.
USPTO, Office Action in U.S. Appl. No. 14/722,566 mailed Jan. 15, 2016.

(Continued)

*Primary Examiner* — Diane Mizrahi
(74) *Attorney, Agent, or Firm* — Lorenz & Kopf, LLP

(57) ABSTRACT

A positioning method includes acquiring global positioning system (GPS) position data associated with a mobile platform from a plurality of GPS satellites observable by the mobile platform. A set of wireless range measurements associated with the mobile platform and a plurality of wireless access points in communication with the mobile platform are acquired. The method further includes receiving, from a server communicatively coupled to the mobile platform over a network, wireless position data associated with the plurality of wireless access points. A corrected position of the mobile platform is determined based on the wireless position data, the wireless range measurements, and the GPS position data.

14 Claims, 3 Drawing Sheets

(56) References Cited

OTHER PUBLICATIONS

German Patent and Trade Mark Office, Examination Report for German Patent Application No. 10 2016 104 547.0 mailed Feb. 20, 2017.

Liqiang Xu, et al., "Vehicle Positioning Using Wi-Fi Networks and GPS/DR System," 2009 Fifth International Conference on Mobile Ad-hoc and Sensor Networks, Fujian, 2009, pp. 287-293; retrieved from the internet on Feb. 20, 2017 from: URL: http://ieeexplore.ieee.org/stamp/stamp.jsp?tp=&arnumber=5401524&isnumber=5401465.

Soumaya Zirari, et al., "WiFi GPS based Combined positioning Algorithm," 2010 IEEE International Conference on Wireless Communications, Networking and Information Security, Beijing, China, 2010, pp. 684-688; retrieved from the internet on Feb. 20, 2017 from: URL: http://ieeexplore.ieee.org/stamp/stamp.jsp?tp=&arnumber=5544653&isnumber=5541718.

USPTO, Final Office Action in U.S. Appl. No. 14/722,566 mailed Jun. 20, 2016.

\* cited by examiner

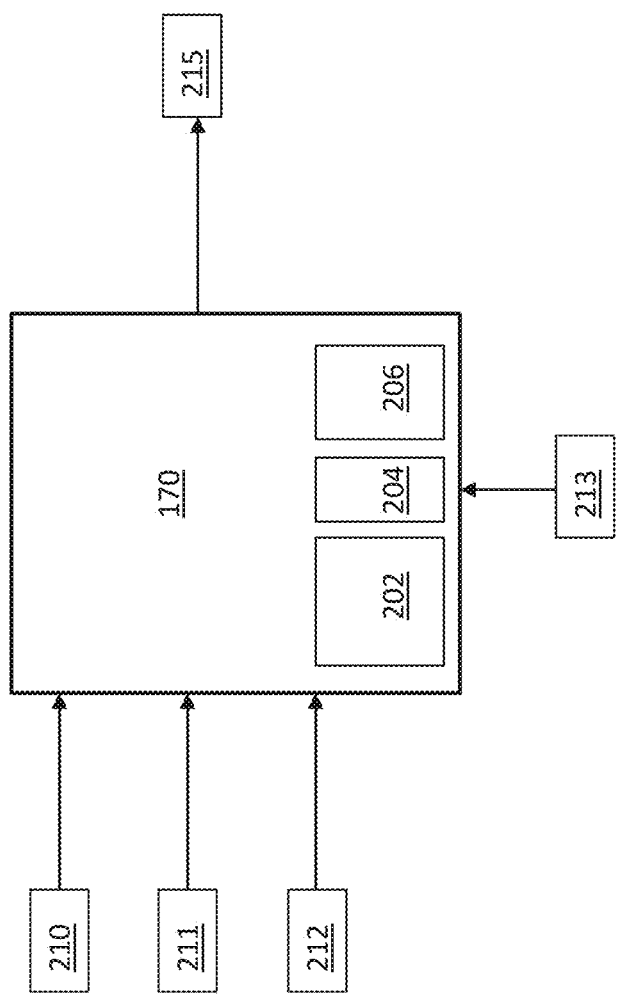

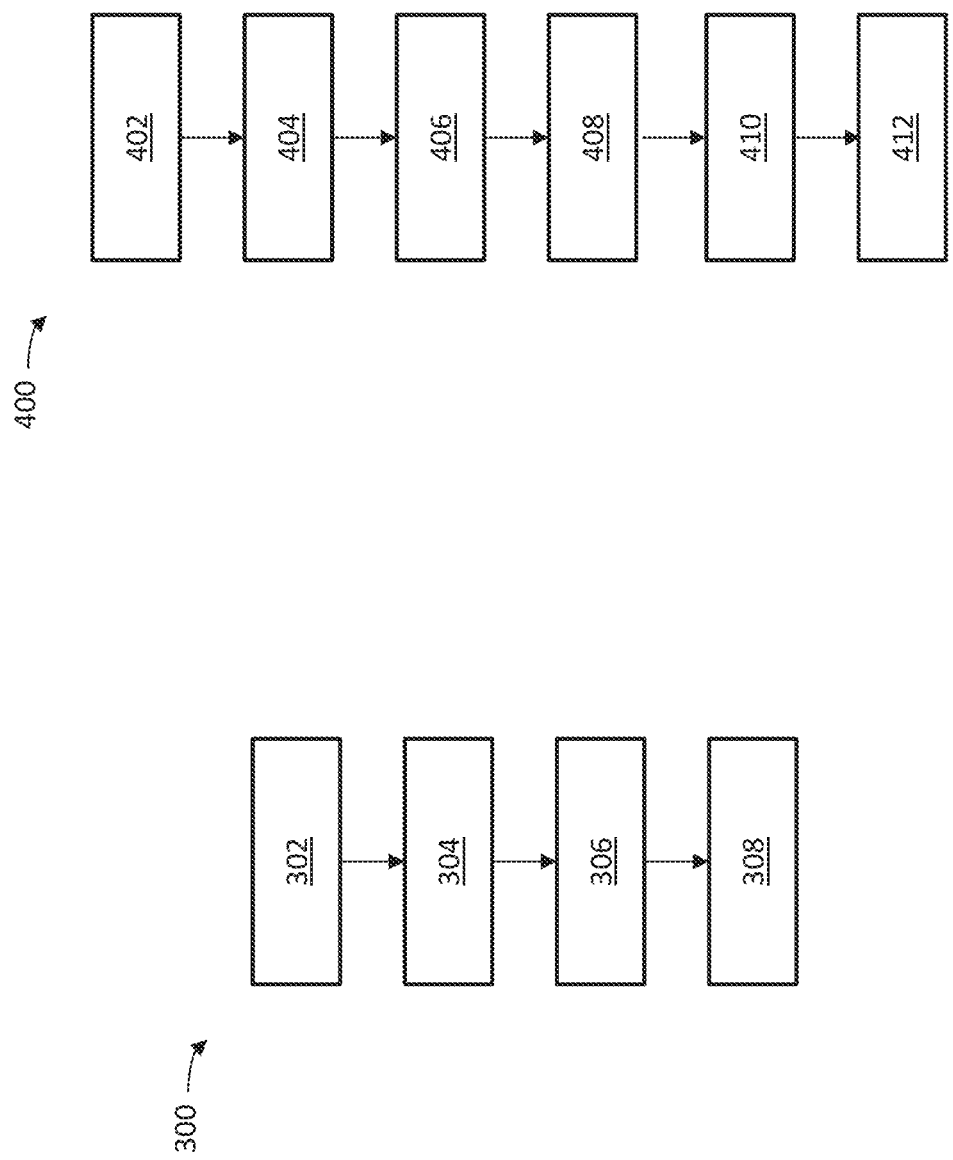

SYSTEMS AND METHODS FOR RESOLVING POSITIONAL AMBIGUITIES USING ACCESS POINT INFORMATION

TECHNICAL FIELD

The technical field generally relates to mobile platforms. The technical field more particularly relates to systems and methods for correcting positional data of such mobile platforms in the presence of ambiguities.

BACKGROUND

Recent years have seen an increase in the use of mobile platforms incorporating both wireless networking capabilities (e.g., WiFi) and global positioning system (GPS) capabilities. Such mobile platforms include, for example, mobile computing devices, such as laptop computers, tablet computers, smartphones, etc., and systems of transportation, such as automotive vehicles, buses, motorcycles, trains, marine vessels, aircraft, rotorcraft and the like.

Under most conditions, current GPS systems are capable of quickly providing highly accurate positioning data. Nevertheless, under non-optimal conditions, GPS systems might provide ambiguous data—for example, in cases where the mobile platform is in a position in which the optimal number of GPS satellites may not be observable by the mobile platform, such as a canyon, a tunnel, a parking garage, etc.

Accordingly, it is desirable to provide more robust systems and methods for determining the position of a mobile platform relative to its environment in cases where the GPS positioning data is ambiguous. Additional desirable features and characteristics of the present invention will become apparent from the subsequent detailed description and the appended claims, taken in conjunction with the accompanying drawings and the foregoing technical field and background.

SUMMARY

In accordance with one embodiment, a positioning method includes acquiring GPS position data associated with a mobile platform from a plurality of GPS satellites observable by the mobile platform. A set of wireless range measurements associated with the mobile platform and a plurality of wireless access points in communication with the mobile platform are received (e.g., via time-of-flight measurements). Wireless position data associated with the plurality of wireless access points is received from a server communicatively coupled to the mobile platform over a network. A corrected position of the mobile platform is determined based on the wireless position data, the wireless range measurements, and the GPS position data.

In accordance with one embodiment, a positioning module for a mobile platform includes a processor and a memory. The memory is configured to store software instructions that, when executed by the processor, cause the processor to: acquire a set of wireless range measurements associated with the mobile platform and a plurality of wireless access points in communication with the mobile platform; receive, from a server communicatively coupled to the mobile platform over a network, wireless position data associated with the plurality of wireless access points; and determine a corrected position of the mobile platform based on the wireless position data, the wireless range measurements, and the GPS position data.

DESCRIPTION OF THE DRAWINGS

The exemplary embodiments will hereinafter be described in conjunction with the following drawing figures, wherein like numerals denote like elements, and wherein:

FIG. 2 is a conceptual block diagram of a positioning module in accordance with various embodiments;

FIG. 3 is a flowchart depicting a positioning method in accordance with various embodiments; and FIG. 4 is a flowchart depicting a position prediction method in accordance with various embodiments.

DETAILED DESCRIPTION

Figure 1:
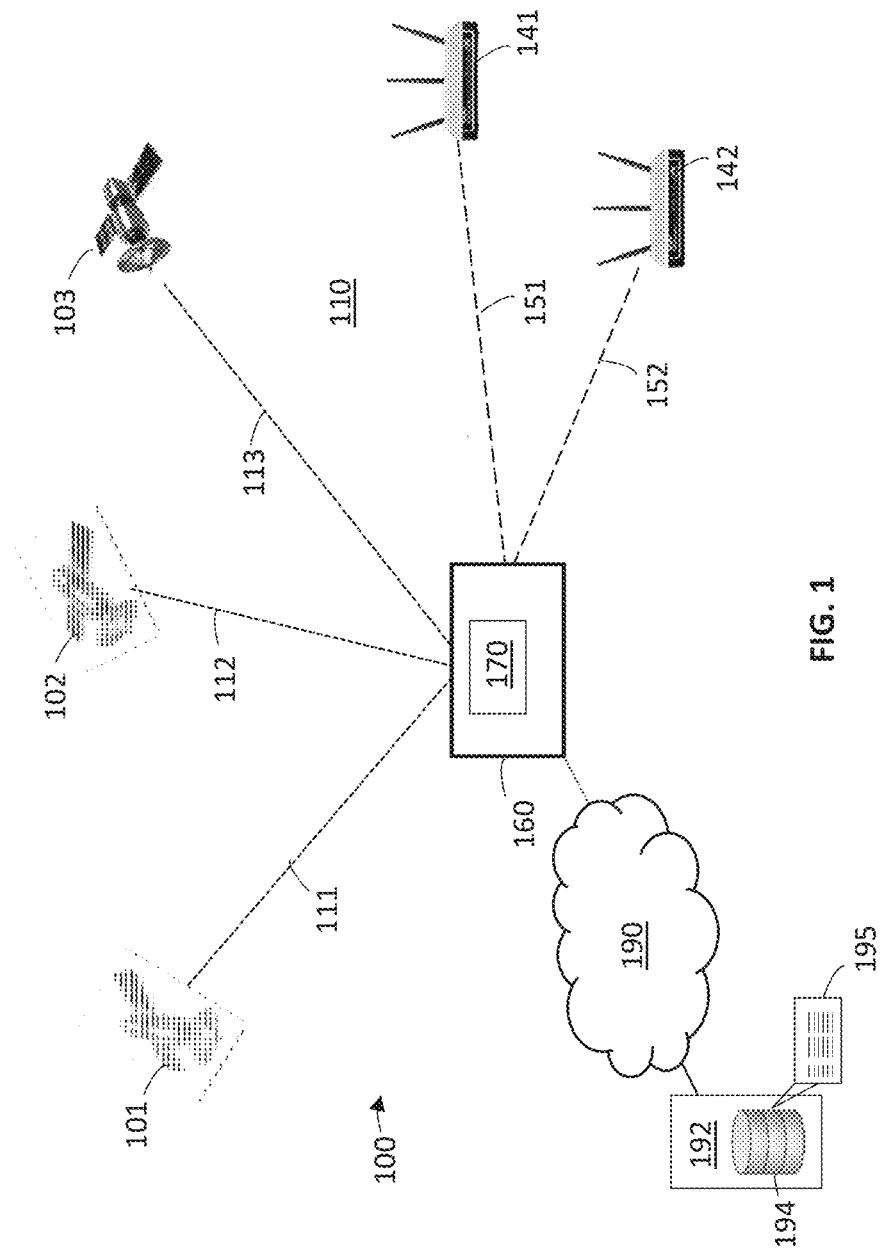
FIG. 1 is a conceptual block diagram of a positioning system in accordance with various embodiments.

The subject matter described herein generally relates to systems and methods for correcting or otherwise reducing the ambiguity of GPS position data (e.g., in the case where GPS satellite coverage is non-optimal) using information available about the position of wireless networks, such as WiFi access points, in the vicinity of the mobile platform. As used herein, the term "mobile platform" includes mobile computing devices, such as laptop computers, tablet computers, smartphones, etc., and systems of transportation, such as automotive vehicles, buses, motorcycles, trains, marine vessels, aircraft, rotorcraft and the like. Data regarding the positions of respective access points is stored on a remote server (e.g., in the "cloud") and is requested and received by the mobile platform when necessary. This information regarding the position(s) of known access points APs is then "fused" with the GPS position data to arrive at a more accurate estimate of position.

The following detailed description is merely exemplary in nature and is not intended to limit the application and uses. Furthermore, there is no intention to be bound by any expressed or implied theory presented in the preceding technical field, background, brief summary or the following detailed description. As used herein, the term "module" refers to an application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of mobile platforms, and that the mobile platform described herein is merely one example embodiment of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Referring to FIG. 1, a positioning system 100 generally includes a mobile platform 160 in communication with (e.g., within range of) one or more wireless access points ("APs") 141 and 142. Such mobile platforms 160 include, for example, mobile computing devices, such as laptop computers, tablet computers, smartphones, etc., and systems of transportation, such as automotive vehicles, buses, motorcycles, trains, marine vessels, aircraft, rotorcraft and the like. Dotted lines 151 and 152 designate, respectively, the distance or "range" from mobile platform 160 to APs 141 and 142. Mobile platform 160 is also capable of communicating with, and determining its position with respect to environment 110, using one or more positioning satellites (e.g., GPS satellites) 101, 102, and 103. Dotted lines 111, 112, and 113 designate the distances (or "ranges") from mobile platform 160 to GPS satellites 101, 102, and 103, respectively. Mobile platform 160 is further configured to communicate with a backend server (or simply "server") 192 over a network 190.

As described in further detail below, server 192 includes a database 194 configured to store positional data 195 associated with APs 141 and 142. This data may take a variety of forms, but in one embodiment includes a list of APs (indexed by the unique MAC address of each AP) along with geographical positions of those APs in a suitable coordinate frame (e.g., an ECEF coordinate frame). That is, server 192 knows, a priori, and within some acceptable range of accuracy, the positions of APs 141 and 142 within environment 110. Using this data, in conjunction with other available information, a positioning fusion module (or simply "module") 170 within mobile platform 160 is configured to determine a "corrected" position of mobile platform 170 when the position data derived from satellites 101, 102, and 103 is ambiguous (e.g., when less than four such satellites are observable by mobile platform 160). Data 195 may be populated in a variety of ways. For example, data 195 may be adaptively populated and improved over time based on GPS data received simultaneously with range data from multiple mobile platforms 160 as those mobile platforms pass by and interact with APs 141 and 142. That is, data 195 may be "crowd-sourced" from multiple mobile platforms 160.

Wireless access points 141 and 142 may be implemented as any form of network component configured to provide wireless access to a network. In accordance with one embodiment, APs 141 and 142 are implemented as access points conforming to the IEEE 802.11 family of standards (e.g., "WiFi"). In one embodiment, wireless access points 141 and 142 are implemented as what is often termed a "next-gen" WiFi AP that includes the capability of determining range measurement using time-of-flight techniques as set forth in the IEEE 802.11v standard. That is, mobile platform 160 is configured to determine ranges 151 and 152 based on the time required for signals to "echo" back and forth between mobile platform 160 and APs 141 and 142.

In general, GPS satellites 101-103 broadcast microwave signals that allow GPS receivers (e.g., mobile platform 160) on or near the Earth's surface (in environment 110) to determine its location as well as a synchronized time value. GPS signals, as is known in the art, generally include ranging signals, used to measure the distance (111-113) to the respective satellites (101-103), as well as various navigation messages. The navigation messages include, for example, ephemeris data (used to calculate the position of each satellite 101-103 in orbit) and information about the time and status of the entire satellite constellation—i.e., the "almanac." In general, such information is referred to herein collectively as "GPS position data." In one embodiment, the GPS position data is provided relation to an earth-centered, earth-fixed (ECEF) coordinate frame, as is known in the art.

While FIG. 1 illustrates three satellites 101-103, it will be appreciated that mobile platform 160 may, depending on the conditions, observe a greater or lesser number of such satellites. While it is generally desirable that at least four GPS satellites be observable at all times (to provide suitably accurate position data), in the case of urban canyon environments and the like it is not unusual for only two or three satellites to be observable. Under such conditions, as mentioned above, the position data derived from satellites 101-103 may be ambiguous. In such cases, however, there may be many APs within range of mobile platform 160 (e.g., within a neighborhood with a dense concentration of access points).

Referring now to FIG. 2 in conjunction with FIG. 1, a more detailed block diagram of positioning module 170 in accordance with an exemplary embodiment will be described. In general, module 170 includes a processor 202 (e.g. a microprocessor, microcontroller, etc.), a memory component 204 (e.g., RAM, ROM, etc.), and storage component 206 (e.g., a solid-state drive (SSD), a convention hard-drive, or the like). Processor 202 is configured to execute software instructions stored in memory component 204 to provide the functionality described herein. In general, module 170 is, in general, configured to produce "corrected" (e.g., more accurate) position data 215 based on a variety of inputs.

In the illustrated embodiment, module 170 receives GPS position data 211, corresponding, for example, to pseudorange data, Doppler data, carrier phase information, and ephemeris data derived from satellites 101-103. Module 170 receives data 210, corresponding to various dynamic properties of mobile platform 160 (e.g., speed, yaw rate, etc.), which may be determined from an inertial measurement unit (IMU) (not shown) or the like integrated into mobile platform 160. Data 210 may also include signals from a variety of additional sensor devices providing, for example, video, LiDAR, radar, and ultrasonic signals associated with the mobile platform 160.

Module 170 further receives wireless position data (e.g., data 195 stored on server 192) characterizing the position of APs 141 and 142 within environment 110. Finally, module 170 receives range data (determined, for example, via time-of-flight echo techniques) corresponding to ranges 151 and 152 from mobile platform 160 to APs 141 and 142, respectively.

Having thus given an overview of a positioning system 100 and a positioning fusion module 170 in accordance with one embodiment, FIG. 3 is a flowchart depicting a positioning method 300 in accordance with various embodiments, and will, without loss of generality, be described in conjunction with the embodiment shown in FIGS. 1 and 2.

First, at 302, module 170 acquires GPS position data (211) associated with mobile platform 160 from the GPS satellites (101-103) that are observable by mobile platform 160. This may be performed periodically, or only when the plurality of GPS satellites observable by the mobile platform is less than a predetermined number (e.g., four) GPS satellites.

Next, at 304, module 170 acquires (e.g., via time-of-flight measurements) a set of wireless range measurements (213)

associated with mobile platform 160 and a plurality of wireless access points (e.g., 141, 142) in communication with mobile platform 160. In this regard, mobile platform 160 is "in communication with" APs 141, 142 in the sense that the communication (e.g., receipt of beacon signals, initiation of the association process) is sufficient to allow measurement of ranges 151 and 152. Mobile platform 160 need not be strictly associated with AP 141, 142. In accordance with various embodiments, a wireless range measurement (such as wireless range measurement 213) is determined via time-of-flight measurements of back-and-forth communication between two nodes A and B (which might correspond, for example, to mobile platform 160 and wireless access point 141, respectively) as follows: let t0 represent the time at which node A sends a packet (i.e., a data packet as is known in the art) to node B (measured at node A), let t1 represent the time at which node B receives this packet from node A (measured at node B), let t2 represent the time at which node B sends the packet to node A (measured at node B), and let t3 represent the time at which node A receives the packet from node B (measured at node A). The time-of-flight is then calculated as half of the overall round trip time of the packet (t3−t0) minus the interval between when node B received and sent the packet (t2−t1). That is, time-of-flight=((t3−t0)−(t2−t1))/2.

Next, at 306, mobile platform 160 receives, from server 192, wireless position data 212 associated with wireless access points 141 and 142. This data may take a variety of forms, but in one embodiment includes a list of APs (indexed by the unique MAC address of each AP) along with geographical positions of those APs in a suitable coordinate frame (e.g., an ECEF coordinate frame). Receipt of data 213 may be the result of module 170 querying server 192 for the coordinates of APs 141 and 142 (a subset of data 195) based on the MAC addresses determined by mobile platform 160. Data 195 may be stored as any convenient data structure, and may include various other pieces of information, such as a statistical measure (e.g., confidence interval and covariance matrix) associated with the AP position in formation. Any suitable data structure and/or database may be used to store wireless position data 212.

Data 195 may be populated in a variety of ways. For example, data 195 may be adaptively populated and improved over time based on GPS data received simultaneously with range data from multiple mobile platforms 160 as those mobile platforms pass by and interact with APs 141 and 142. That is, data 195 may be "crowd-sourced" from multiple mobile platforms 160. The present disclosure is not so limited, however, and applies to any positioning system 100 that utilizes wireless position information 212 as described above, regardless of how data 195 is produced.

Next, at 308, module 170 determines a corrected position 215 of the mobile platform 160 based on the wireless position data 212, the wireless range measurements 213, and the GPS position data 211. Module 170 may also use dynamic data 210 to further refine the correction and determine a heading and/or velocity of mobile platform 160.

Determining the corrected position may be accomplished in a variety of ways, but in general includes "fusing" and integrating what is known about the position of mobile platform 160 given the (potentially ambiguous) information from satellites 101-103 and the potentially more accurate data from APs 141 and 142. For example, the range data 151 and 152 along with the position information 212 may be weighted more heavily when averaged along with the GPS position data 211 to determine a corrected position 215.

Having thus given an overview of a positioning system and associated method, a detailed description of an exemplary method in which position fusion module 170 may determine the corrected position (corrected heading and/or corrected velocity of the mobile platform 160) will now be set forth in conjunction with FIG. 4 and FIG. 1. Briefly, the following equations set forth an iterative algorithm based on estimation theory.

First, at 402, the predicted position of mobile platform 160 is given as $\tilde{p}=(\tilde{X}, \tilde{Y}, \tilde{Z})$, corresponding to the x, y, and z coordinates (e.g., in ECEF coordinate frame) within environment 110. The equations for the unknown position p of mobile platform 160 including GPS receiver clock drift T are then given as:

$$\sqrt{(X-X(s_i))^2+(Y-Y(s_i))^2+(Z-Z(s_i))^2}+cT=\rho(s_i)+v_i \quad (1)$$

$$\sqrt{(X-X(w_k))^2+(Y-Y(w_k))^2+(Z-Z(w_k))^2}=\rho(w_k)+v_k \quad (2)$$

where X, Y, and Z are the coordinates of the position p; $X(s_i)$, $Y(s_i)$, and $Z(s_i)$ are the coordinates of the position of the $s_i$-th satellite (101, 102, etc.); $X(w_k)$, $Y(w_k)$, and $Z(w_k)$ are the coordinates of the position of the $w_k$-th WiFi AP (e.g., 141, 142); $\rho(s_i)$ and $\rho(w_k)$ are the measured ranges (e.g., 151, 152) between the mobile platform 160 and the $s_i$-th satellite and $w_k$-th WiFi AP, respectively; and c is the speed of light in vacuum.

For satellites i=1, 2, 3 (corresponding, e.g., to 101-103) and WiFi APs 141 and 142 k=a, b; $v_i$ and $v_k$ are random noise terms. Linearizing the measurement equations (1) and (2) in the neighborhood of $\tilde{p}$ gives:

$$\text{Let } \tilde{\rho}(s_i)=\sqrt{(\tilde{X}-X(s_i))^2+(\tilde{Y}-Y(s_i))^2+(\tilde{Z}-Z(s_i))^2} \quad (3)$$

$$\text{and } \tilde{\rho}(w_k)=\sqrt{(\tilde{X}-X(w_k))^2+(\tilde{Y}-Y(w_k))^2+(\tilde{Z}-Z(w_k))^2} \quad (4)$$

Equation (1) may be approximated as:

$$\frac{\tilde{X}-X(s_i)}{\tilde{\rho}(s_i)}(X-\tilde{X})+\frac{\tilde{Y}-Y(s_i)}{\tilde{\rho}(s_i)}(Y-\tilde{Y})+\frac{\tilde{Z}-Z(s_i)}{\tilde{\rho}(s_i)}(Z-\tilde{Z})+cT=\rho(s_i) \quad (5)$$

and Equation (2) may be approximated as:

$$\frac{\tilde{X}-X(w_k)}{\tilde{\rho}(w_k)}(X-\tilde{X})+\frac{\tilde{Y}-Y(w_k)}{\tilde{\rho}(w_k)}(Y-\tilde{Y})+\frac{\tilde{Z}-Z(w_k)}{\tilde{\rho}(w_k)}(Z-\tilde{Z})= \quad (6)$$
$$\rho(w_k)-\tilde{\rho}(w_k).$$

Furthermore, equations (5) and (6) can be combined and expressed as an equality in matrix form as:

$$\begin{pmatrix} \frac{\tilde{X}-X(s_i)}{\tilde{\rho}(s_i)} & \frac{\tilde{Y}-Y(s_i)}{\tilde{\rho}(s_i)} & \frac{\tilde{Z}-Z(s_i)}{\tilde{\rho}(s_i)} \\ \frac{\tilde{X}-X(w_k)}{\tilde{\rho}(w_k)} & \frac{\tilde{Y}-Y(w_k)}{\tilde{\rho}(w_k)} & \frac{\tilde{Z}-Z(w_k)}{\tilde{\rho}(w_k)} \end{pmatrix} \begin{pmatrix} X \\ Y \\ Z \end{pmatrix} = \quad (7)$$

$$\begin{pmatrix} \rho(s_i)-\tilde{\rho}(s_i)-cT \\ \rho(w_k)-\tilde{\rho}(w_k) \end{pmatrix} + \begin{pmatrix} \frac{\tilde{X}-X(s_i)}{\tilde{\rho}(s_i)} & \frac{\tilde{Y}-Y(s_i)}{\tilde{\rho}(s_i)} & \frac{\tilde{Z}-Z(s_i)}{\tilde{\rho}(s_i)} \\ \frac{\tilde{X}-X(w_k)}{\tilde{\rho}(w_k)} & \frac{\tilde{Y}-Y(w_k)}{\tilde{\rho}(w_k)} & \frac{\tilde{Z}-Z(w_k)}{\tilde{\rho}(w_k)} \end{pmatrix} \begin{pmatrix} \tilde{X} \\ \tilde{Y} \\ \tilde{Z} \end{pmatrix}.$$

Writing Equation (7) in matrix operation form gives:

$$Hp=o+H\tilde{p}+v, \quad (8)$$

where v is a random noise term. Without loss generality, it can be assumed that v is zero-mean with an identity covariance matrix. If v is a zero-mean Gaussian distribution, or v~N(0, R), one can multiply both side by the Cholesky factor of the inverse of R to derive measurement equation with an identity covariance matrix.

Assuming the predicted position $\tilde{p}$ is in Gaussian distribution $N(\mu, \tilde{\Sigma})$, or in information array form: (Prior) $p\sim[\tilde{R}, \tilde{z}]$, where $\tilde{R}^T \tilde{R} = \tilde{\Sigma}^{-1}$, $\tilde{R}\mu = \tilde{z}$, at 406 the matrix $$\begin{bmatrix} \tilde{R} & \tilde{z} \\ H & o \end{bmatrix},$$

can be constructed and QR decomposition applied such that the upper triangular matrix can be written as $$\begin{bmatrix} \hat{R} & \hat{z} \\ o & e \end{bmatrix}.$$

At 408, the corrected position $\hat{p} = \hat{R}^{-1}\hat{z}$, with the posterior distribution $p\sim[\hat{R}, \hat{z}]$, can then be provided (corresponding to 215 in FIG. 2).

Assuming the mobile platform dynamic equation $\tilde{p}=f(\hat{p}, v)+w$, where $\hat{p}$ is the previous corrected position at time t, v is mobile platform velocity vector, w is a Gaussian noise vector with zero-mean and unity covariance, and $\tilde{p}$ is the predicted mobile platform position at time t+Δt. The above nonlinear dynamic equation can be linearized (at 410) within the neighborhood of $\hat{p}$ as $F\tilde{p}+G\hat{p}=u+w$.

Constructing, at 412, the matrix $$\begin{pmatrix} \hat{R} & 0 & \hat{z} \\ G & F & u \end{pmatrix},$$

and applying QR decomposition, one can obtain the upper triangular matrix $$\begin{pmatrix} \alpha & \beta & \gamma \\ 0 & \tilde{R} & \tilde{z} \end{pmatrix}.$$

The predicted position, at time t+Δt, is then $\tilde{p}=\tilde{R}^{-1}\tilde{z}$ with a distribution of $\tilde{p}\sim[\tilde{R}, \tilde{z}]$. Now the predicted (prior) distribution is ready for deriving posterior distribution upon arrival of new measurements (corresponding, for example, to 302-304 of FIG. 3).

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A positioning method, comprising:
   acquiring global positioning system (GPS) position data associated with a mobile platform from a plurality of GPS satellites observable by the mobile platform;
   acquiring a set of wireless range measurements associated the mobile platform and a plurality of wireless access points in communication with the mobile platform;
   receiving, from a server communicatively coupled to the mobile platform over a network, wireless position data associated with the plurality of wireless access points; and
   determining a corrected GPS position associated with the mobile platform based on the wireless range measurements acquired from the wireless access points in communication with the mobile platform.

2. The method of claim 1, wherein acquiring the wireless range measurements includes determining a distance from the mobile platform to each of the plurality of wireless access points using WiFi time-of-flight measurement information provided by the wireless access points.

3. The method of claim 1, wherein the corrected position is determined when the plurality of GPS satellites observable by the mobile platform is less than four GPS satellites.

4. The method of claim 1, wherein the mobile platform is an automotive vehicle.

5. The method of claim 1, including determining the corrected position based on a yaw rate and a speed of the mobile platform.

6. The method of claim 5, further including determining a corrected heading and velocity of the mobile platform based on the wireless position data, the wireless range measurements, and the GPS position data.

7. The method of claim 1, wherein the corrected position is based on a predicted position and a posterior distribution associated with the predicted position.

8. A positioning module for a mobile platform, the positioning module comprising:
   a processor;
   a memory configured to store software instructions that, when executed by the processor, cause the processor to:
      acquire a set of wireless range measurements associated with the mobile platform and a plurality of wireless access points in communication with the mobile platform;
      receive, from a server communicatively coupled to the mobile platform over a network, wireless position data associated with the plurality of wireless access points; and
      determine a corrected GPS position associated with the mobile platform based on the wireless range measurements acquired from the wireless access points in communication with the mobile platform.

9. The positioning module of claim 8, wherein a distance from the mobile platform to each of the plurality of wireless access points is determined using WiFi time-of-flight measurement information provided by the wireless access points.

10. The positioning module of claim 8, wherein the corrected position is determined based on the number of GPS satellites observable by the mobile platform.

11. The positioning module of claim 8, wherein the positioning module is configured to be integrated into a transportation system.

12. The positioning module of claim 8, wherein the software instructions further cause the processor to determine the corrected position based on a yaw rate and a speed of the mobile platform.

13. The positioning module of claim 12, wherein the software instructions further cause the processor to determine a corrected heading and velocity of the mobile platform based on the wireless position data, the wireless range measurements, and the GPS position data.

14. The positioning module of claim 8, wherein the corrected GPS position is based on a predicted position and a posterior distribution associated therewith.

* * * * *